United States Patent [19]

McDonald

[11] Patent Number: 4,558,819

[45] Date of Patent: Dec. 17, 1985

[54] AUTOMATIC VALVE CLOSER TO PREVENT TAMPERING WITH A THERMOSTATIC CONTROLLED RADIATOR

[76] Inventor: Robert McDonald, 128 Eagle St., Emmaus, Pa. 18049

[21] Appl. No.: 578,507

[22] Filed: Feb. 9, 1984

[51] Int. Cl.[4] ............................................. F24F 11/06
[52] U.S. Cl. .................................... 236/42; 137/329.2; 236/DIG. 2
[58] Field of Search ......... 236/42, 99 R, 100, DIG. 2, 236/43; 137/329.1–329.4; 251/82

[56] References Cited

U.S. PATENT DOCUMENTS

| | | | |
|---|---|---|---|
| 862,614 | 8/1907 | Davey | 251/82 |
| 1,226,175 | 5/1917 | Bibleheiser, Jr. | 137/329.1 |
| 1,242,864 | 10/1917 | Ricks | 137/329.2 |
| 1,905,942 | 4/1933 | Lawler | 236/42 |
| 2,387,793 | 10/1945 | Holmes | 236/DIG. 2 |
| 2,833,301 | 5/1958 | Argus | 137/329.1 |
| 2,845,083 | 7/1958 | Graybill | 137/329.1 |
| 3,405,729 | 10/1968 | Young et al. | 137/329.2 |
| 4,089,461 | 5/1978 | Gocke | 236/42 |

Primary Examiner—William E. Tapolcai
Attorney, Agent, or Firm—Ruth Moyerman

[57] ABSTRACT

A tamper proof cartridge for use in nonelectric thermostatic valve sensors is disclosed. The usual cartridge includes a temperature sensor, operably connected to a push rod and an upper elongated stem by a spring. The upper stem terminates in an orifice sealer. The upper stem and sealer are of predetermined measurements to sealingly fit a valve orifice with a seat face. The improvement includes a lower extension of the upper stem extending below the orifice which terminates in an additional orifice sealer. The lower extension is of a predetermined length to insure that the additional orifice sealer permits flow of heat while the temperature sensor is operational and calls for the orifice to be open. The additional sealer is of sufficient width to seal the orifice. The disconnection of the sensor will cause the spring to urge the stem upward causing the additional orifice sealer to then sealingly fit the orifice, thereby restricting the heat from flowing through the valve.

10 Claims, 3 Drawing Figures

AUTOMATIC VALVE CLOSER TO PREVENT TAMPERING WITH A THERMOSTATIC CONTROLLED RADIATOR

BACKGROUND OF THE INVENTION

1. Field of the Invention

This invention relates to valves, and more particularly to thermostatic and temperature valves.

2. Description of the Prior Art

Public housing for the elderly and low income, public use buildings for government, commercial and sports endeavors, and commercial living units such as motels, hotels and apartments are extensive energy consumers along with military and educational buildings. The cost of operation of such complexes is greatly related to the cost and amount of fuel consumed, particularly if the operator, and not the dweller, is directly responsible for the fuel costs.

Many users of such aforementioned facilities are prone to tamper with the heating system's thermostats to the extent that the sensors are removed, and thereby the maximum amount of heat flows through the system at all times. This is obviously costly and unnecessary.

There is, therefore, a great need for a tamperproof control. Since sensors are usually easy to disconnect, there is a need to provide a device that will restrict the flow of heat, even though the sensor has been tampered with.

SUMMARY OF THE INVENTION

The aforementioned prior art problems are overcome by the tamperproof valve cartridge of this invention.

A cartridge for use in nonelectric thermostatic valve sensors is known. The cartridge includes a temperature sensing means operably connected to a push rod and upper elongated stem by a spring means. The upper stem terminates at its other end in an orifice sealing means. The upper stem is of a predetermined length and the sealing means of a predetermined width to sealingly close the orifice.

This invention comprises a lower extension of the upper stem extending below the orifice which terminates in an additional orifice sealing means. The lower stem extension is of a predetermined length to insure that the additional orifice sealing means does not restrict the flow of heat while the sensor is operational. The sealing means is of sufficient width to sealingly close the orifice when it engages it. In operation, the disconnection, as by removal of the sensing unit (thermostatic control), which causes the spring means to urge the stem upward, also causes the additional orifice sealing means to follow, thereby sealingly close the orifice. The sealing of the orifice restricts the heat from flowing through the valve. The end result is a person improperly removing the control will now shut the valve instead of opening it.

It is, therefore, an object of this invention to provide a device that stops and/or restricts the flow of heat when the temperature sensor control is disconnected.

It is yet another object of this invention to provide the aforesaid device so that it can be retrofitted to the conventional valve cartridge already in manufacture and use.

It is a further object of this invention to provide a device that can be utilized with a conventional valve casting.

It is still another object of this invention to provide a device that can be used in a liquid hot water or gas steam heating system.

It is still a further object of this invention to provide a device that can be used with a heating system using either thread or sweat joints.

It is yet a further object of this invention to provide a device that can be used with a variety of thermostatic sensors.

It is still a further object of this invention to provide a device that can be applied to a removable cartridge for economic repair.

It is still a further object of this invention to provide a device that is applicable to a vast number of valve designs and sizes.

It is finally an object of this invention to provide a device that is applicable to two pipe systems, and also to a modified one pipe system.

These and other objects will be more readily ascertainable to one skilled in the art from a consideration of the following Figures, description and preferred embodiment.

BRIEF DESCRIPTION OF THE DRAWING(S)

DETAILED DESCRIPTION OF THE PREFERRED EMBODIMENT(S)

Figure 1:
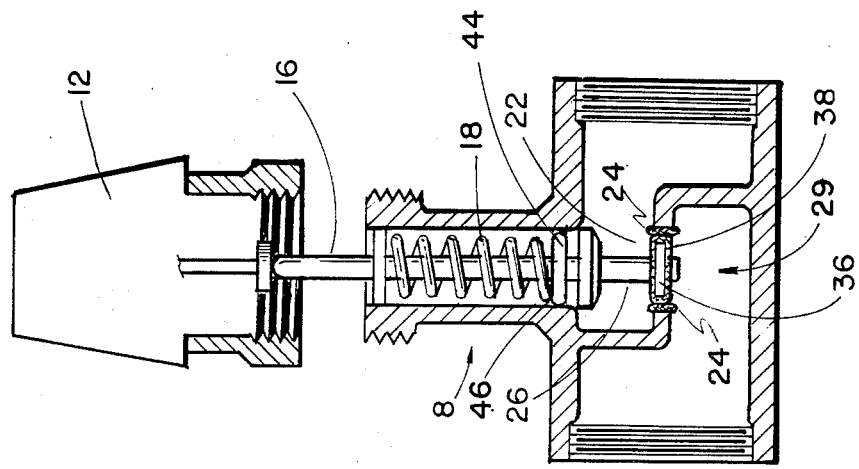
FIG. 1 depicts the device of this invention with the temperature sensor in place and orifice open allowing heat to flow.

Referring now to FIG. 1, temperature sensor 12 is shown in place and orifice 22 is shown open. In this view, heat would be flowing through the system into, for example, a radiator (not shown). Thermostatic valve cartridge 10 is shown threaded into valve 8 where it is operably connected to push rod 14. Temperature sensor 12 is shown without its internal components which are conventional thermostatic elements and form no part of this invention. Upper elongated stem 16 is workably connected to push rod 14 by spring 18. Upper elongated stem 16 terminates in upper orifice sealing means 20. Lower elongated stem extension 26 connects, through screw threads 42, to upper elongated stem 16 below upper orifice sealing means 20 and terminates in additional orifice sealing means 28. Orifice sealing means 28 is screwed to lower elongated extension 26 and held by bolt 40. O ring 44 is positioned at base 46 of spring 18 to permit heat leakage into cartridge 10.

In this view, upper sealing means 20 is above orifice 22 and additional sealing means 28 is below orifice 22, thereby leaving orifice 22 to be shut or to be open to allow steam heat to freely pass through valve 8 by normal operation of sensor 12.

In this view, the preferred embodiment of additional orifice sealing means 28 is shown including middle flexible disk 30 shown slightly larger than orifice 22 and upper disk 32 and lower disk 34, both of which are smaller than orifice 22 so that orifice sealing means 28, as a retrofit, can be forced downward through orifice seat face 24 of orifice 22. Seat face 24 preferably is smooth surfaced to prevent damage of orifice sealing means 28 while it is being forced through seat face 24. Seat face 24 is preferably removable for ease of repair.

Figure 3:
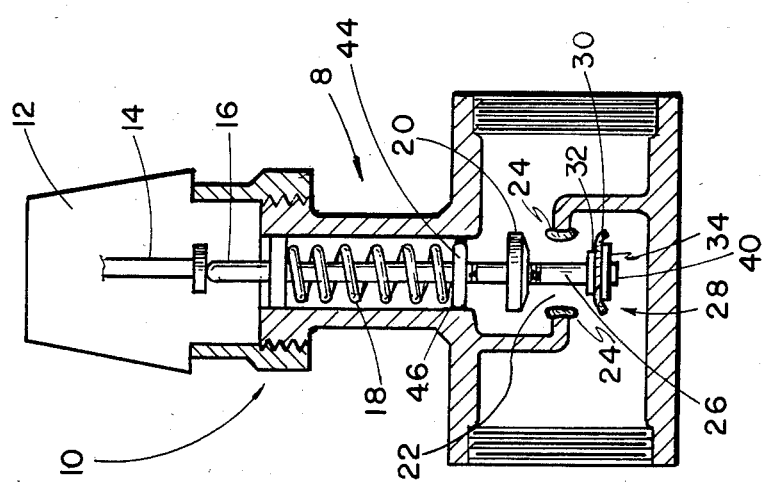
FIG. 3 depicts the device of this invention with the temperature sensor disconnected and the orifice closed by an alternate embodiment of the additional orifice sealing means.
Figure 2:
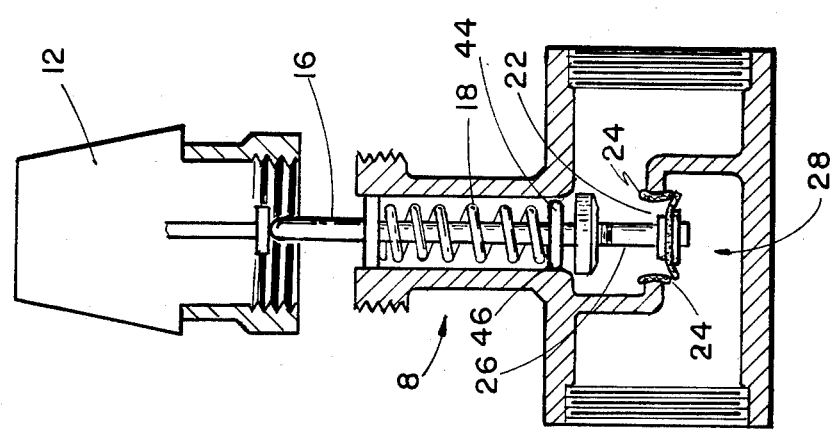
FIG. 2 depicts the device of this invention with the temperature sensor disconnected and the orifice closed by the additional orifice sealing means to prevent heat flow.

Referring now to FIGS. 2 and 3, temperature sensor 12, although depicted, is in fact disconnected and could be totally removed.

Referring now to FIG. 2, sensor 12 is shown disconnected and orifice 22 closed. Without the device of this invention, this removal of the thermostat would result in a wide open valve because of the retraction of upper orifice sealing means 20. However, with the device of this invention, the disconnection of temperature sensor 12 has caused spring 18 to urge upper elongated stem 16 and lower elongated stem extension 26 upward so that additional orifice sealing means 28 has now sealingly close orifice seat face 24 of orifice 22, thereby restricting the heat from flowing through valve 8. O ring 44 is positioned at base 46 of spring 18 to prevent heat leakage into cartridge 10.

Referring now to FIG. 3, an alternate embodiment of sealing means 28 is shown with sensor 12 disconnected and orifice 22 closed. In this view, the disconnection of temperature sensor 12 has also caused spring 18 to urge upper elongated stem 16 and lower elongated stem extension 26 upward so that additional orifice sealing means 29 has now sealingly fit orifice seat face 24 of orifice 22, thereby restricting the heat through valve 8. In this view, additional orifice sealing means 29 is depicted with middle rigid disk 36 encased by flexible body 38, together sized to sealingly fit into seat face 24 of orifice 22.

There are many variations which may be practiced within the scope of this invention.

While rubber and brass disks are suggested, any suitable material may be substituted and still be within the scope of this invention.

Where a seat face is suggested, it may not be necessary as long as the sealing means closes the orifice. Orifice seat face 24, while not essential, is highly desirable for protection of the device of this invention if it is fitted by forcing it through orifice 22.

While brass is suggested as a material for the stems, any suitable material may be substituted and still be within the scope of this invention.

While it has been stated that additional orifice sealing means is sealingly fit, it can also be near sealingly fit to allow a limited heat leakage so that pipes will not freeze and persons will not die from exposure.

The device of this invention has many advantages. Chiefly among these is a device that restricts the flow of heat when the temperature sensor control is disconnected.

Secondly, the device can be retrofitted to the conventional removable valve cartridge already in manufacture and use.

Thirdly, the device can be utilized with a conventional valve casting used in a liquid or gas steam heating system.

Fourth, the device can be used with a variety of thermostatic sensors.

Finally, the device is applicable to all two pipe systems and to one pipe systems that are adapted to accept an air vent.

Having now illustrated and described my invention, it is not intended that such description limit this invention, but rather that this invention be limited only by a reasonable interpretation of the appended claims.

What is claimed is:

1. In a cartridge for use in a nonelectric, thermostatic valve sensor, said cartridge including a temperature sensing means workably attached to a push rod, an upper elongated stem, spring means operably connected to said upper stem, said upper stem terminating in an orifice sealing means, said upper stem being of a predetermined length and said sealing means being of a predetermined width to sealingly close an orifice in a steam and/or hot water heating system from outside said system, the improvement comprising:
    (a) a lower connected stem extension of said upper stem, said stem extension passing through said orifice, said lower stem extension terminating in
    (b) an additional orifice sealing means of sufficient width to sealingly close said orifice from within said heating system, said lower stem extension being of a predetermined length to permit said additional orifice sealing means to remain below and spaced apart from said orifice while said sensor is operational, but which stem length allows said additional orifice sealing means to sealingly close said orifice when said sensing means is disconnected and said upper and lower stems retract in response to said spring's operation.

2. The device according to claim 1 wherein said additional sealing means of part (b) includes a middle flexible disc larger in diameter than said orifice, sandwiched between an upper and lower rigid disc smaller in diameter than said orifice.

3. The device according to claim 2 wherein said rigid discs are brass.

4. The device according to claim 2 wherein said flexible disk is rubber.

5. The device according to claim 1 wherein said additional sealing means includes a middle rigid disc encased by a flexible body, said encasement and said disc sized together to sealingly fit into said orifice.

6. The device according to claim 5 wherein said flexible body is rubber.

7. The device according to claim 5 wherein said rigid disc is brass.

8. The device according to claim 1 wherein said lower extension is threadingly connected to said upper elongated stem.

9. The device according to claim 1 wherein said additional orifice sealing means of part (b) is threadingly connected to lower extension of part (a).

10. The device according to claim 1 wherein said lower stem extension of part (a) is brass.

* * * * *